United States Patent [19]
Rothfjell

[11] 3,805,238
[45] Apr. 16, 1974

[54] METHOD FOR IDENTIFYING INDIVIDUALS USING SELECTED CHARACTERISTIC BODY CURVES

[76] Inventor: Rolf Eric Rothfjell, Luntmakargatan 52, Stockholm, Sweden S10365

[22] Filed: May 9, 1972

[21] Appl. No.: 251,807

[30] Foreign Application Priority Data
Nov. 4, 1971 Sweden.............................. 14109/71

[52] U.S. Cl. ........ 340/146.3 E, 40/2.2, 235/61.7 B, 340/149 A
[51] Int. Cl. ............................................. G06k 9/08
[58] Field of Search............ 340/146.3 E, 146.3 AE, 340/146.3 AC, 149 A; 40/2.2; 356/71; 235/61.7 B

[56] References Cited
UNITED STATES PATENTS
3,292,149 12/1966 Bourne......................... 340/146.3 E
3,638,188 1/1972 Pincoffs et al. ............ 340/146.3 AC
3,533,176 10/1970 Weitzberg et al...................... 40/2.2

*Primary Examiner*—Thomas A. Robinson
*Attorney, Agent, or Firm*—Stevens, Davis, Miller & Mosher

[57] ABSTRACT

A method for identifying individuals using selected characteristic body curves which are usually substantially constant characteristic facial curves derived from one or more images of the individual being identified. The curves may be used for visual comparison with an image of the individual in an identification card format, or the curves may be stored in data processing apparatus and reproduced for comparison, or automatically compared, with an image of the individual presented for use in conjunction with the data processing apparatus.

18 Claims, 5 Drawing Figures

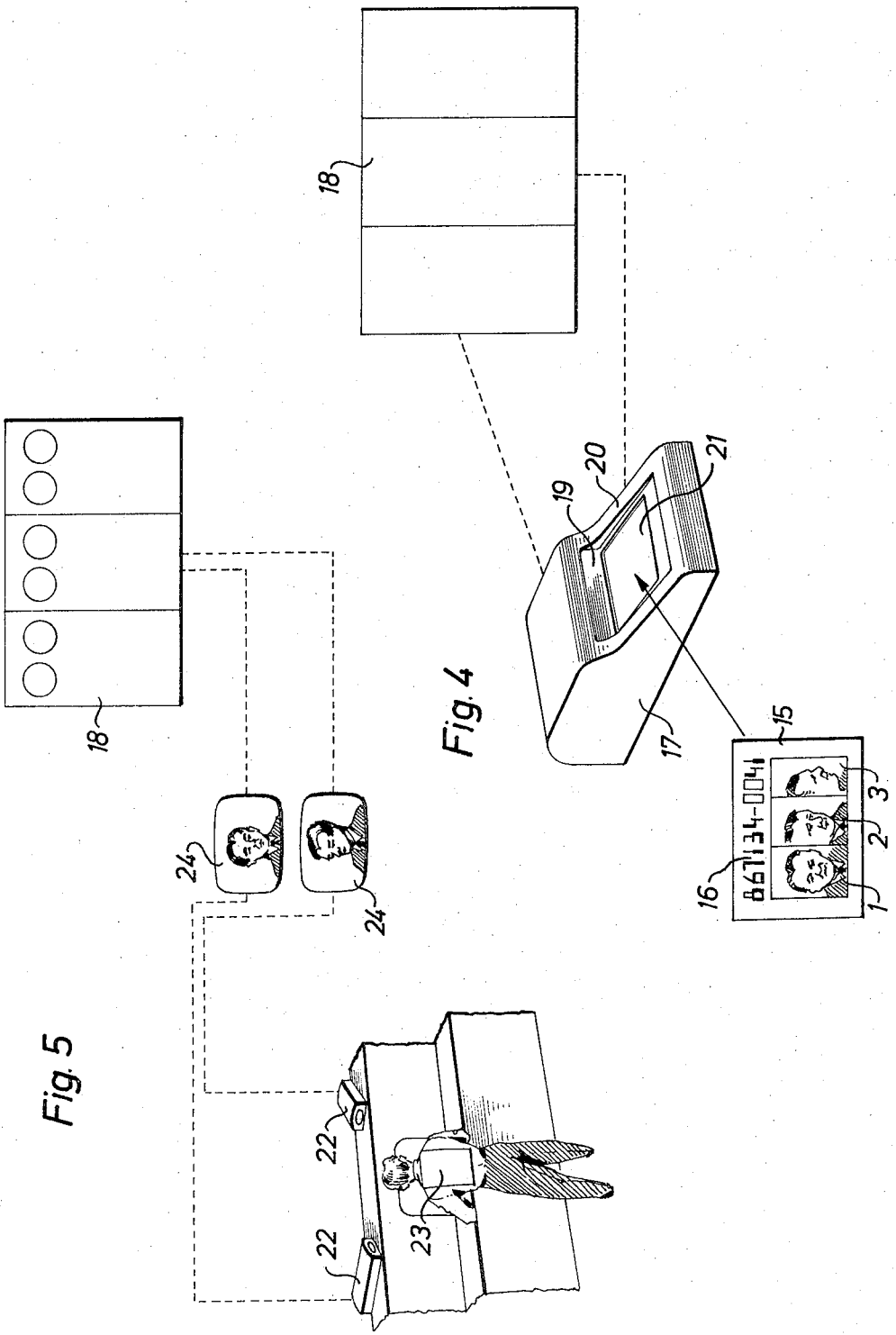

METHOD FOR IDENTIFYING INDIVIDUALS USING SELECTED CHARACTERISTIC BODY CURVES

The present invention relates to a method of identifying individuals, based on the use of means for identifying certain personal characteristic features not previously used for identification purposes.

By "identification" is meant primarily the establishment of a person's identity, i.e. ascertaining whether or not the person in question is the person he asserts himself to be. The principle on which the invention is based, however, can also be used to establish the identity of an unknown person.

For such identification purposes, it has heretofore been a usual practice to use different identity cards provided with certain characteristic features peculiar to the person in question. These cards are mainly intended for visual inspection, i.e. a controller decides by visual examination of the card whether or not the holder of the card possesses the identification features recorded on the card, although such cards can also be checked automatically. The known cards are therefore provided with at least two separate forms of identification data, one for manual identification and one for mechanical identification.

Thus it must be possible to ascertain, either manually or by mechanical means, that an identity card
a. is genuine and not a forgery;
b. has not been altered (had new characteristic features added thereto); and
c. is not used by an unauthorized person.

To fulfil these requirements, the card must be equipped with a relatively large number of safeguards or security measures, which should not be so simple, as to render it possible to forge a card or to enter the characteristic features of another person thereon.

Thus, the present invention relates to a simple method of providing an identity card which is forgery proof, not susceptible to the insertion of new characteristic features, and which cannot be used by unauthorized persons. The identity card of the present invention can be checked manually and by mechanical means, the same characteristic features of the individual being used for both purposes. Accordingly, one object of the present invention is to provide a fully reliable identity card having but a limited number of identification characteristics recorded thereon.

Another object of the invention is to provide means whereby the identity of a person can be checked by data machines. Such a system is becoming more and more desirable with the increasing use of data machines, especially in such cases where it is necessary to ensure that only authorized persons have access to certain data stored in the machine. For this purpose, the method has been applied to provide each person concerned with a secret personal code, which upon request for information from the data machine is punched into the machine by the holder, at the same time as the machine is fed with other data on punched card or magnetic tape, for example, whereupon the data machine checks that the coded number inserted therein coincides with the information recorded on the punched card or tape. This metnod has the disadvantage that, in spite of all precautions, it is possible for unauthorized persons to obtain knowledge of a person's secret code number, together with other necessary information. Attempts have also been made to use the voice as an identification characteristic. However, the characteristics of the human voice are not constant, and when used for automatic identification purposes will not at times coincide sufficiently with the voice stored in the data machine. The use of finger prints has also been suggested, but they can be forged.

Thus, there is a need for identification means which can be readily stored in a data machine, in a manner such that the machine can compare the recorded identification means with the person himself or an image thereof presented to the machine The identification means should be in the form of natural features of the person concerned, as opposed to an arbitrary digital or letter code or the like, the features being so individual as to exclude practically all risk of another person having identical characteristic features. The features selected for identification means should be ones which remain constant for many years, preferably for the lifetime of the person concerned. The identification means should also be visible to the naked eye, to facilitate visual identification.

Accordingly, another object of the invention is to provide a reproduction of a feature which is a characteristic of a person to be issued with identification means and which can be identified in a data processing apparatus.

A further object of the invention is to provide means for comparison between the person's characteristic features stored in the data processing apparatus and the person presenting the identification means to the apparatus, the comparison means either being the person himself or an image thereof.

Yet another object of the invention is to provide an identification means which is forgery proof, prevents unauthorized use, and which can be used in connection with monetary transactions, particularly those with which data processing apparatus are used for debiting an account belonging to the person concerned.

As mentioned above, attempts have previously been made to utilize special, characteristic features of individuals for identification purposes. The features hitherto used, however, have been of a particularly simple nature and relatively easy to forge.

The facial features of a person naturally constitute good characteristic data for identification purposes. With present day techniques, however, it is not practical to store complete images of a person's face in a data processing machine. Further, it is also difficult to compare by means of data processing apparatus a complete image of a person stored in the apparatus with the person himself or with another complete image of said person.

This problem is solved in accordance with the present invention by using as identification characteristics at least one curve derived from life-like images of the face of the person concerned.

The principle of the invention can be applied by photographing the face of the person concerned and deriving from the photograph a curve portraying, for example, the outer contours of the face. Although it is possible to use a single photograph, it is preferred in accordance with the invention to use several photographs, for example one photograph taken full face, one photograph in profile and one photograph taken at an angle of approximately 45° to the face, and derive curves from all photographs.

The invention will now be described with reference to the accompanying drawings, further features of the invention being disclosed in connection therewith. In the drawings.

Figure 2:
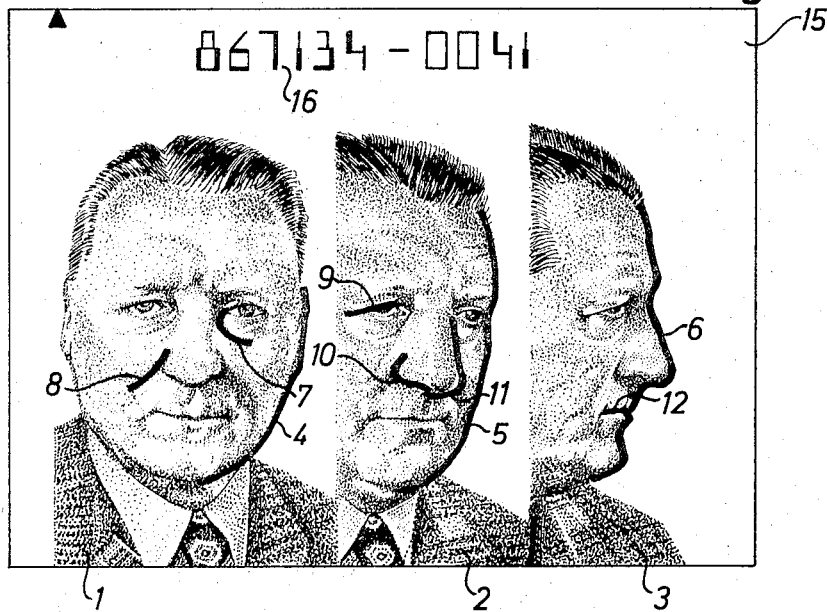
FIG. 2 illustrates the same series of photographs as illustrated in FIG. 1, but including examples of curves which can be derived from the photographs for identification purposes.

FIG. 4 partially schematically illustrates a data system for identifying a series of photographs such as those illustrated in FIG. 2; and FIG. 5 partially schematically illustrates a system by which a person is identified directly.

Figure 1:
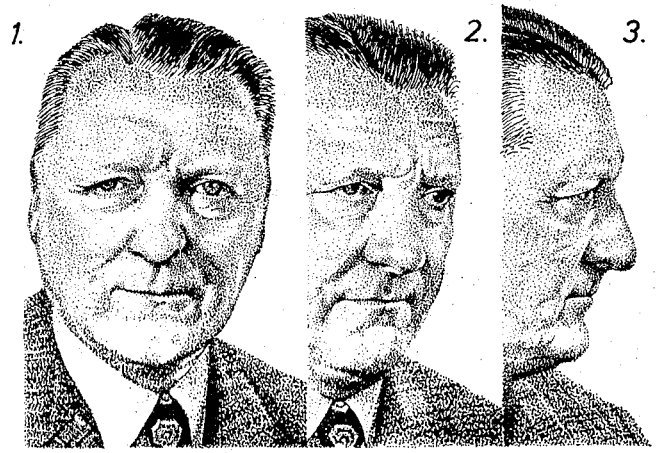
FIG. 1 illustrates a series of photographs.

With reference to the drawings, FIG. 1 illustrates a series of life-like photographs of a person, i.e. a series of conventional black and white photographs. In principle, the photographs can be taken with any suitable camera, using a conventional film from which copies can be made in the normal manner. A suitable camera for the purpose is, for example, a camera of the Antenna type, disclosed in U. S. Pat. No. 2,868,096. The film may be either black and white or color film of normal sensitivity, such as the well known commercially available films produced by AGFA or Kodak, for example. The film is developed by conventional methods.

The series of photographs illustrated in FIG. 1 show the same person in three different positions. The series comprises a full-face photograph 1, a photograph 2 taken at an angle of about 45° and a photograph 3 taken in profile. While the example illustrated herein comprises three views taken at different angles, it should be understood that any number of such photographs (from one on up) may be sufficient in various embodiments of the inventive system.

Figure 3:
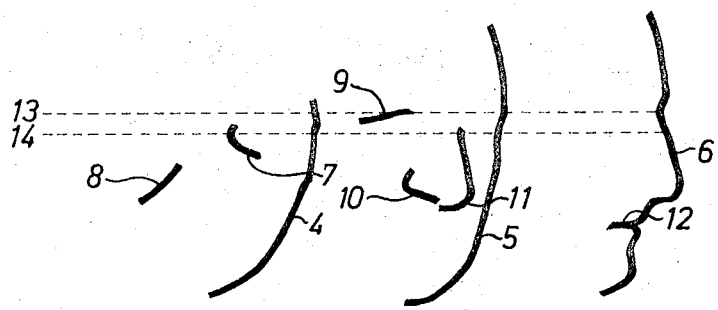
FIG. 3 shows the curves illustrated in FIG. 2 isolated from the remainder of respective photographs, and shows examples of different ways of sampling data for use in data processing apparatus in which the series of photographs is to be stored, and/or which is intended to identify said series and thus also the person concerned.

FIG. 2 shows the same series of photographs as illustrated in FIG. 1, but with certain curves accentuated by heavy lines, said curves following characteristic contours of the face in each photograph. Thus, curves 4, 5 and 6 are contour lines at the right hand portion of the facial image in each photograph 1, 2 and 3 respectively. In photograph 1, additional curves 7 and 8, characteristic of the face of the person concerned, are accentuated in the same manner as curves 4, 5 and 6. Similarly, curves 9, 10, 11 are accentuated in photograph 2 and curve 12 in photograph 3. In FIGS. 2 and 3, the curves 4 – 12 have been inserted on the front surface of photographs 1 – 3. This can have a distracting effect on a person viewing the photographs and also hides the actual lines of the photograph. To overcome this disadvantage, the curves 4 – 12 are preferably inserted on the rear surface of the photographs 1 – 3. As will be evident from FIGS. 1–3, the person concerned has been characterized by a number of curves which in the selected combination can only be found in the face of or images of the face of that particular person, who has consequently been specifically defined. Obviously, the number of curves can be in excess of that shown or can be less. A variation in the number of curves selected affords greater varation in the possibility of positive identification. In the afore-described manner, an original or master image is obtained which is suitable for derivation of and storing curves 4 – 12 in a data processing apparatus, for example a digital computer apparatus such as an IBM 370. The original may also be used as an identity card, as shown at 15 in FIG. 4, for example.

The curves 4 – 12 can be taken from the photographs 1 – 3 by drawing in free hand on copies thereof, by photographic or xerographic high-contrast copying techniques, by electronic amplification of the contrasts in the photographs, or by means of a laser beam which can be guided by prominent contrasts in the facial image in the photograph. The important thing is that the curves 4 – 12 follow the intended contours with such accuracy that, at least when compared with the naked eye, they would seem fully identical therewith. Each curve 4 – 12 shall cover a sufficiently large portion of the contour line in question to substantially eliminate the possibility of similar curves being found on two persons.

When preparing an identity card for the person in question, the curves 4 – 12 can be inserted on the rear side of the photograph, whose front surface shows the three photographs 1 – 3, and covered with a layer of plastic material which is sufficiently translucent or transparent to allow visual inspection of the information in the card. For example any of the well known transparent plastics, such as polyesters like polyethylene or polyethylene teraphthalate, may be used as an overcoating. In this way, it can be assured that the photographs present on the identify card actually belong thereto and have not been altered or subsequently applied. The genuineness of the card may be checked by holding the card up to a light, whereby it can readily be ascertained whether the curves which should compare with corresponding contours on the photographs actually do so or not. Thus, it is virtually impossible to adopt the identity of the person to whom the card 16 was issued, simply by affixing one's own photographs above the curves.

The obtained curves 4 – 12, which are shown in FIG. 3 isolated from the remainder of the respective photographs, can also be readily stored in a data processing machine, for example, by identifying any number of points on each curve by coordinate points in relation to suitably selected axes. Three dimensional curves may also be readily stored in a data processing machine, and it lies within the purview of the present invention to use three dimensional curves derived from three dimensional images such as holograms. Such curves can be stored in data processing apparatus, for example using an optical reader such as the commercially available IBM 1287 or IBM 1288 readers, the reading result of which can be fed into data storage element in the computer apparatus. The curves can be read in horizontal and/or vertical steps, as indicated at 13 and 14 in FIG. 3, or in any other appropriate manner. Of course to preserve the integrity of the data memory bank, only authorized persons must be allowed to insert data into the computer memory.

Thus, the curve lines 4 – 12, shown in FIG. 3 represent the information stored in the memory of the data processing apparatus. The number of points selected on each curve is not critical, but — as will be readily understood — the closer together the points selected on the curve the more reliable the identification data.

The afore-mentioned identity card 15, with the curves 4 – 12 disposed on the rear face of the photographs 1 – 3, or underneath the same, can also be checked manually. Thus, when one wishes to check the authenticity of the card vis-a-vis the holder, the checking authority, e.g. bank teller, police, passport control etc., need only compare the photograph on the card with the face of the person presenting the card, and then hold the card to the light to ascertain whether the curves beneath the photographs coincide with the facial contours thereof.

Further, as will be apparent from the foregoing description, the curves need not be recorded on the card itself, but can be stored in a data processing apparatus. FIG. 4 partially schematically illustrates a system with which the identity of a person can be checked by means of an identity card which does not itself include the aforementioned selected facial curves. In this instance, the identity card has affixed thereto a series of photographs 1 – 3 corresponding to those illustrated in FIG. 1, in addition to which there is preferably recorded thereon a personal account number 16, or any other desired personal data or information.

The card 15 used with the embodiment of FIG. 4, and lacking the facial curves, can be used for identification purposes in banks, shops and the like, where the cashier, for example, may make a visual comparison between the photographs 1 – 3 and the person presenting the card. For the purpose of checking that the photographs are genuine and that the card is not a forgery, the cashier in accordance with the invention then inserts the card into a remote electronic reading and reproducing station means, such as that depicted at 17, which is connected to a main data processing apparatus in which the characteristic curves 4 – 12 are stored. The reading and reproducing means may comprise, for instance, a reader portion 19 adapted to read the code numbers 16 on the card. The type of reading device used in the present invention may be one for reading magnetic characters, wherewith the code number is written accordingly, or one which employs optical reading means, although any suitable read device may be used.

The reader portion 19 transmits the number sensed by it to the main data processing unit 18, which responds by transmitting data belonging to the person identified by the number 16 to a reproducing means 20 having a screen 21 both of which are a part of the remote unit 17. The data transmitted to the reproducing means 20 contains information relating to the curves 4 – 12 characteristic of the facial contours of the person concerned, the curves are then reproduced on the screen 21 of the reproducing means 20.

Thus, when one wishes to verify the geniuneness of such a card, the card 15 is placed in the reader and reproducing means 17, with the photographs 1 – 3 lying on top of the screen 21, and the remote device is operated to initiate a read signal to the reader portion 19, whereupon the above sequence of events takes place. The curves reproduced and illuminated on the screen 21 may then be visually inspected through the card to determine if they coincide with the corresponding curves on the photographs 1 – 3 on the card.

The above described system can also be connected to account records terminals, so that the customer is able to use his identity card as a credit card, wherewith the cashier need only insert the item to be recorded on the customers account on a key-board associated with the data processing apparatus 18, in which the customer's account data is also stored. In addition, the computerized system may include means for printing out a person's's characteristic curves, or any other data, and such a print out system may be used to produce receipts or other records of each transaction made by an authorized individual.

In the aforementioned manner, it is possible to check in a simple manner — either with or without the help of data processing apparatus — whether or not the card was issued to the person presenting it. Obviously, if the characteristic curves inserted beneath the photograph or on the rear face thereof, or those displayed on a screen connected to a data system, do not coincide with corresponding facial curves on the photographs, then there is indication that the card has been altered or is not genuine.

By combining the two above described methods of illustrating the facial curves characteristic of the person concerned, e.g. by storing the curves both on the card itself and in the data processing unit 18, the data processing unit itself can be programmed to check the authenticity of the card. In this instance, the reader portion 19 of the reader and reproducing means 17 is provided with a read-out means, such as an optical read-out means corresponding to that discussed above for reading the curves 4 – 12 for storage in the data processing unit 18. When checking the identity card presented by the person concerned, the cashier, for example, first visually checks that the features of said person are those reproduced in the photographs 1 – 3, whereafter the cashier places the card in the reader means of remote station 17. The reader portion 19 then reads the curves and a comparison is made with the curves stored in the memory unit of the main data processing apparatus 18, this comparison being effected automatically in the data processing apparatus 18 which can thereby establish a person's right to obtain the desired information. In this respect, the memory register of the data processing apparatus is searched with the guidance of, for example, a personal number, account number or the like recorded on the card 16, or optionally with the guidance of a personal code which has been inserted on the card in the afore-described manner, whereafter the data processing apparatus 18 compares the curves 4 – 12 on the card 15 with those in the data memory register. If the curves do not coincide, the data processing apparatus will not provide the information requested, and will refuse to effect the transaction. In addition, the curves present on any presented card may also be stored in a special register, thereby enabling subsequent checks to be made as to which persons have attempted to use the system under false pretenses, which may be of value under certain circumstances, especially, for example, in police or private investigatory work.

In addition, the memory register of the data processing apparatus may be searched without the initial guidance of a personal account number or personal code. The data derived from the curves in the card may itself initiate the search of the memory register. After initiation, the search proceeds in accordance with the method already programmed in the data processing apparatus.

It also lies within the purview of the present invention to incorporate in the data processing apparatus the initial check that the curves coincide with corresponding contours on the photographs by providing the data processing apparatus with means which will enable it to sense both the photographs and the curves simultaneously in accordance with a predetermined program and to establish whether or not the curves do correspond.

Thus, it is not necessary to store the entirety of each curve in the series 4 – 12 in the data memory of the main data processing apparatus 18, but each curve need only be represented by a predetermined number of points, the co-ordinates of which are stored in said memory. When reading an identity card in the reader portion 19, the result is transmitted to the main data processing apparatus 18 and need only be checked to ensure that the points stored therein satisfy said result.

In this instance, the reader portion 19 need only be constructed to read the curves 4 – 12 recorded on the card 15 along one or more determined sensing lines, as exemplified by the lines 13 and 14 shown in FIG. 3. The number of scanning lines used, the point at which the scan is commenced and the direction of the sweep are all factors which can be varied as desired, which constitute key features in the identity code, and hence are also factors which should be maintained in secrecy insofar as possible. The card may thus be checked according to either the on line or the off line technique. With all of the above described mechanical checks, the card is read along one or more scanning lines. Each point at which the lines 13, 14 cross a curve line 4 – 12 can be allocated a numerical value, these values being suitably totalled together and used as a check number.

Further, it is possible with the aid of television cameras and optical systems for reproducing the curves 4 – 12 stored in the data processing apparatus 18, to make a direct comparison between the stored curves and the actual face of the person concerned. This can be effected by means of the data prcessing apparatus alone or by means of said apparatus together with the cooperation of the person involved.

Thus, instead of using an identity card it is possible to use the person concerned as the actual object for comparison with the characteristic curves 4 – 12 stored in the data processing apparatus. In this embodiment there may be arranged between the person concerned, e.g. the customer, and the cashier, a sheet of glass, for example, onto which the curve lines stored in the data processing apparatus can be projected. Projection of the curves onto the glass screen may be initiated by inserting the indentification number submitted by the customer onto a keyboard at a remote station, whereupon the main data processing apparatus causes the curves to be projected in response thereto. The customer may then be asked to position himself before the glass screen to be aligned with fixed points corresponding, for example, to the position of the eyes, mouth etc., whereupon the cashier is able to establish whether or not the curves on the screen coincide with corresponding curves on the face of the person concerned.

A corresponding and more positive identification can be provided by applying the technique of direct identification as illustrated in FIG. 5 by training one or more television cameras on the face of the person concerned, whereby image signals are passed to monitors 24. The monitors 24 produce in principle an image similar to that illustrated in FIG. 1, wherewith the curves 4 – 12 or a certain number of points of said curves taken from the memory unit of the data processing apparatus can be superimposed on the respective monitors 24, so that the curves of said image on the monitors should coincide with the superimposed curves. In this way there is obtained in the monitors 24 a view similar to that illustrated in FIG. 2, or parts thereof, provided that the customer has given the correct identification number.

When using the inventive system to establish the identity of an unknown person, it is of course necessary that a comparison be made between curves originating from the face of the person and a memory register containing curve lines originating from a number of known persons.

Another use to which the present invention can be put is that of establishing any familiar relationship between different persons, the data processing apparatus being programmed to make a comparison between the curve lines of the persons whose relationship with respect to each other is to be established by means of comparing the similarity of their facial characteristic curves.

The present invention has been herein described with reference to the contour lines of the face of the person concerned, reproduced at one or more angles. However, other features than those illustrated can be used, such as the shape of the eyes, ears or mouth. Furthermore, if the outer contour line of the face is used, particularly prominent points on the face can be projected onto the outer contour line in accordance with predetermined rules and the especially pronounced points thus obtained, may provide further check possibilities.

Curves of the type used herein do not normally change with passing years, or at least only vary slightly, and may remain substantially constant throughout the lifetime of the person concerned. When such facial curves do change, however, for example as a result of an accident, plastic surgery, or serious illness, it will of course be necessary to rephotograph the face and replace the old curve lines with fresh ones taken from the more recent photograph.

It is again emphasized that the inventive system offers positive protection of the integrity of the person concerned, since the system can be applied in a manner such that no operations can be effected in the data processing apparatus without the presence of the person concerned.

What is claimed is:

1. A method of identifying an individual, comprising:

providing an image of at least a portion of the individual's face which includes at least one substantially constant body curvature;
   defining at least one selected characteristic curve from said facial image;
   storing said characteristic curve; and
   comparing an image of an individual's face to said stored curve to determine whether said curve coincides with a corresponding curve in the compared image.

2. The method of claim 1 wherein a plurality of images of the individual's face are provided, a plurality of selected characteristic curves are defined from said plurality of images, said curves are stored, and a plurality of images of an individual are compared to said stored curves.

3. The method of claim 1, wherein said curve is stored in an identification card.

4. The method of claim 3, wherein said curve and an image to be compared with said curve are both stored in an identification card.

5. The method of claim 1, wherein data corresponding to points on said curve is stored in a data processing apparatus.

6. The method of claim 5, wherein said data is stored in a digital computer.

7. The method of claim 6, wherein the image to be compared to said curve is created from the individual himself by an instant access imaging device, information from said imaging device is transmitted to said computer, and data corresponding to a curve stored in said computer is retrieved and presented for comparison with information from a corresponding curve in the image.

8. The method of claim 7, wherein the image to be compared is created by a television camera.

9. The method of claim 7, wherein said data and information are presented to an optical projection device for visual comparison.

10. The method of claim 7, wherein said data and information are presented to a comparator within said computer for automatic comparison.

11. A method of identifying an individual, comprising:
providing an image of at least a portion of the individual's face which includes at least one substantially constant facial curvature;
defining at least one selected characteristic curve from said image;
storing data corresponding to points on said characteristic curve in a digital computer; and
comparing an image of an individual's face to said stored characteristic curve to determine whether said curve coincides with a corresponding curve in the compared image, by presenting said image to a reading means associated with said computer, which reading means transmits information corresponding to curves in said image of said computer, and the data corresponding to a curve stored in said computer is retrieved and presented for comparison with a corresponding curve in the image.

12. The method of claim 11, wherein said data is presented to an optical projection device for visual comparison of the presented data with the image.

13. The method of claim 11, wherein said data and information read from said image by said reading means are presented to a comparator within said computer for automatic comparison of said data with said image.

14. The method of claim 11, wherein the image to be compared to said curve is stored in an identification card with is presented to the reading means associated with said computer.

15. The method of claim 14, wherein said reading means is activated by information in said identification card.

16. An identification card comprising,
at least one image of the face of an individual;
at least one selected characteristic curve which conforms to a corresponding curve in said image, said characteristic curve being on a separate surface from said image, but superimposed on one side of the image in a position so that it corresponds to a curve in said image;
a laminating material laminating together the image and characteristic curve.

17. The identification card of claim 16, wherein said card is sufficiently translucent for visual comparison of said characteristic curve with the corresponding curve in said image.

18. The identification card of claim 16, wherein said card contains other identifying information concerning the individual whose image appears therein.

* * * * *